(12) United States Patent
Sahukari et al.

(10) Patent No.: US 9,863,401 B2
(45) Date of Patent: Jan. 9, 2018

(54) MULTI BANDWIDTH VOLTAGE CONTROLLERS FOR A WIND POWER PLANT

(71) Applicant: VESTAS WIND SYSTEMS A/S, Aarhus N (DK)

(72) Inventors: Sridhar Sahukari, Beckenham (GB); Kouroush Nayebi, Ikast (DK); Peter Frederick Mayer, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 771 days.

(21) Appl. No.: 14/346,470

(22) PCT Filed: Sep. 28, 2012

(86) PCT No.: PCT/DK2012/050361
§ 371 (c)(1),
(2) Date: Mar. 21, 2014

(87) PCT Pub. No.: WO2013/044923
PCT Pub. Date: Apr. 4, 2013

(65) Prior Publication Data
US 2014/0300108 A1 Oct. 9, 2014

Related U.S. Application Data

(60) Provisional application No. 61/539,988, filed on Sep. 28, 2011.

(51) Int. Cl.
*G05D 3/12* (2006.01)
*F03D 7/02* (2006.01)
(Continued)

(52) U.S. Cl.
CPC ............. *F03D 7/028* (2013.01); *F03D 7/047* (2013.01); *F03D 7/048* (2013.01); *F03D 9/257* (2017.02);
(Continued)

(58) Field of Classification Search
CPC .......... Y02E 10/723; Y02E 60/74; H02J 3/18; H02J 3/16; F03D 7/048; F03D 7/0284; F03D 7/047; F03D 7/045; F03D 7/046
See application file for complete search history.

(56) References Cited

U.S. PATENT DOCUMENTS 6,424,873 B1 * 7/2002 Przybylski ............... G05B 5/01
318/610
6,961,637 B2 * 11/2005 Scherer .............. G05B 19/4163
700/173

(Continued)

FOREIGN PATENT DOCUMENTS

| EP | 1512869 A1 | 3/2005 |
|---|---|---|
| WO | 2009/083448 A2 | 7/2009 |
| WO | 2012/028150 A2 | 3/2012 |

OTHER PUBLICATIONS

International Search Report for PCT/DK2012/050361, dated Dec. 20, 2012.

*Primary Examiner* — Darrin Dunn
(74) *Attorney, Agent, or Firm* — Patterson + Sheridan, LLP

(57) ABSTRACT

The present invention relates to a wind power plant, with at least one wind turbine generator, where each of the at least one wind turbine generator has a first voltage controller with a first bandwidth, arranged for controlling a voltage level, and where the wind power plant has a power plant controller with a second voltage controller with a second bandwidth also arranged for controlling the voltage level, the first bandwidth is larger than the second bandwidth. The inven- (Continued)

tion also relates to a method for controlling the voltage level of a wind power plant, by using multi bandwidth voltage controllers.

20 Claims, 6 Drawing Sheets

(51) Int. Cl.
F03D 7/04 (2006.01)
H02J 3/12 (2006.01)
H02J 3/38 (2006.01)
H02P 9/44 (2006.01)
F03D 9/25 (2016.01)

(52) U.S. Cl.
CPC ............... *H02J 3/12* (2013.01); *H02J 3/386* (2013.01); *H02P 9/44* (2013.01); *Y02E 10/723* (2013.01); *Y02E 10/763* (2013.01)

(56) References Cited

U.S. PATENT DOCUMENTS

| | | | | |
|---|---|---|---|---|
| 2003/0146165 A1* | 8/2003 | Katsube | ............ | B09C 1/08 210/695 |
| 2003/0200317 A1* | 10/2003 | Zeitak | ............ | H04W 16/02 709/226 |
| 2003/0227172 A1* | 12/2003 | Erdman | ............ | F03D 7/0284 290/44 |
| 2004/0167659 A1* | 8/2004 | Scherer | ............ | G05B 19/4163 700/173 |
| 2005/0095493 A1* | 5/2005 | Yoshimoto | ............ | H01M 8/0258 429/508 |
| 2006/0255594 A1* | 11/2006 | Larsen | ............ | F03D 9/005 290/44 |
| 2008/0073912 A1* | 3/2008 | Fortmann | ............ | F03D 9/005 290/44 |
| 2008/0088129 A1* | 4/2008 | Altemark | ............ | F03D 7/043 290/44 |
| 2010/0211190 A1* | 8/2010 | Akita | ............ | G05B 19/4142 700/3 |
| 2010/0276930 A1* | 11/2010 | Fortmann | ............ | F03D 9/003 290/44 |
| 2010/0308585 A1* | 12/2010 | Jorgensen | ............ | F03D 7/0284 290/44 |
| 2010/0312409 A1* | 12/2010 | Zeumer | ............ | H02J 3/386 700/287 |
| 2010/0312410 A1* | 12/2010 | Nielsen | ............ | F03D 7/028 700/287 |
| 2010/0326673 A1* | 12/2010 | Borgstadt | ............ | B25J 9/1664 166/381 |
| 2010/0332042 A1* | 12/2010 | Riesberg | ............ | F03D 7/0284 700/287 |
| 2011/0029100 A1* | 2/2011 | Seem | ............ | G05B 19/4062 700/37 |
| 2012/0056602 A1* | 3/2012 | Li | ............ | H02P 9/48 322/89 |

* cited by examiner

MULTI BANDWIDTH VOLTAGE CONTROLLERS FOR A WIND POWER PLANT

FIELD OF THE INVENTION

The present invention relates generally to a wind power plant, and in particular, to a method for controlling the voltage level of the wind power plant.

BACKGROUND OF THE INVENTION

A wind turbine is an energy conversion system which converts kinetic wind energy into electrical energy for utility power grids. Specifically, wind incident on blades of the wind turbine generator (WTG) causes a rotor of the WTG to rotate. The mechanical energy of the rotating rotor in turn is converted into electrical energy by an electrical generator.

A wind power plant is often referred to as a group of wind turbine generators which are commonly connected to an electrical grid through a common connection point, also known as Point of Common Coupling (PCC). Additionally the wind power plant may comprise a power plant controller (PPC) and/or some sort of reactive power compensation equipment, such as STATCOMs or switch capacitors, or others.

Due to the advancements in the grid code requirements and more wind energy entering into the electrical grid, there is an important need for wind turbine generator and especially wind power plant to be able to provide the support required by the grid whenever necessary. Voltage stability is seen to be the major problem in many power systems especially at the location of the wind power plant. Hence, the wind power plant and its wind turbine generators should be able to provide advanced support which can be comparable to that of the traditional synchronous machine with respect to the voltage support.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, the present invention relates to a wind power plant, comprising at least one wind turbine generator,
 wherein each of the at least one wind turbine generator has a first voltage controller with a first bandwidth, arranged for controlling a voltage level, and
 wherein the wind power plant has a power plant controller with a second voltage controller with a second bandwidth also arranged for controlling the voltage level,
 wherein the first bandwidth is larger than the second bandwidth.

An advantage of first aspect is that the present invention helps wind power plants meeting the grid code requirements which are stringent with respect to the voltage and reactive power/current control. It also enables connection of turbines to weak grids without causing much problems of voltage instability.

Throughout this description, the term "bandwidth of a controller" is to be understood at what higher frequency the controller still provides a response, similar to the classical analogue interpretation: The bandwidth frequency is defined as the frequency at which the closed-loop magnitude response is equal to −3 dB. So a controller with a high bandwidth will provide a fast response to changes and a controller with a low bandwidth will provide a slow response. In the digital control the term "bandwidth of a controller" may be understood as a measure of available or consumed data communication resources expressed in bits/second or multiples of it. Thus, "bandwidth of a controller" can be seen as synonymous with "bit rate of a controller", "channel capacity of a controller" or "throughput of a controller". A controller with a high bandwidth will have a high bit rate and thus provide a fast response to changes, whilst a controller with a lower bandwidth will have a lower bit rate and thus provide a slower response. Both interpretations can be used.

According to one embodiment of the invention, the ratio between the first bandwidth and second bandwidth is between 5 and 20.

An advantage of this embodiment of the present invention is that this ratio provides a stable and robust voltage control for wind power plant connected to an electrical grid with a high short circuit ratio.

According to one embodiment of the invention, the ratio between the first bandwidth and second bandwidth is between 10 and 20.

An advantage of this embodiment of the present invention is that this ratio provides a stable and robust voltage control for wind power plant connected to an electrical grid with a low short circuit ratio.

According to one embodiment of the invention, the ratio between the first bandwidth and second bandwidth is depending on a short circuit ratio at a common connection point of the wind power plant.

An advantage of this embodiment of the present invention is that arranging the ratio according to the short circuit ratio will provide a stable and robust voltage control for wind power plant connected to almost any electrical grid.

According to one embodiment of the invention, the gains and the ratio of the gains for both slow and fast controllers can be changed based on the SCR and the X/R ratio of the grid.

An advantage of this embodiment of the present invention is that this variable gains can control the speed of delivery of the reactive power/current to the grid which provides a stable and robust voltage control for wind power plant connected to an electrical grid.

According to one embodiment of the invention, the first and/or second bandwidth can be varied based on an impedance of a grid connecting point of the wind power plant.

According to one embodiment of the invention, it further comprising a reactive power compensation unit with a third voltage controller with a third bandwidth, wherein the third bandwidth is larger than first and second bandwidth.

An advantage of this embodiment of the present invention is that having a reactive power compensation unit, with the ability of a fast control of the reactive power supply, such as STATCOMs, with a third voltage controller provides a more stable and robust voltage control for wind power plant connected to an electrical grid.

According to one embodiment of the invention, it further comprising a reactive power compensation unit with a third voltage controller with a third bandwidth, wherein the third bandwidth is smaller than first and second bandwidth.

An advantage of this embodiment of the present invention is that having a reactive power compensation unit, without the ability of a fast control of reactive power supply, such as MSC (Mechanically Switched Capacitor) or SVCs, with a third voltage controller provides a more stable and robust voltage control for wind power plant connected to an electrical grid According to one embodiment of the invention, it further comprising a measurement device for measuring the voltage at a point of common coupling, said measurement device being arranged for communicating a signal to the power plant controller, which can restart the control loop.

An advantage of this embodiment is that the present invention provides a system to detect changes in the voltage level at a point of common coupling.

According to one embodiment of the invention, the power plant controller being arranged to feed an interrupt to the at least one wind turbine generator, said at least one wind turbine generator is arranged for acting upon the interrupt.

An advantage of this embodiment is that the present invention is arranged for acting upon the interrupt instead of waiting for a next sample from the power plant controller, which decreases the response time for the control loop.

In a second aspect, the present invention relates to method for controlling a voltage level in a wind power plant, with at least one wind turbine generator, and a power plant controller, the method comprises the steps of:

controlling the voltage level by a first voltage controller arranged within the at least one wind turbine generator said first voltage controller having a first bandwidth, controlling the voltage level by said power plant controller and a second voltage controller with a second bandwidth wherein the first bandwidth is larger than the second bandwidth.

The advantages of the second aspect and its embodiments are equivalent to the advantages for the first aspect of the present invention.

According to one embodiment of the second aspect of the invention, the wind power plant further comprising a reactive power compensation unit with a third voltage controller, the method comprises a further step of:

controlling the voltage level by the third voltage controller with a third bandwidth, wherein the third bandwidth is larger than first and second bandwidth.

According to one embodiment of the second aspect of the invention, the wind power plant further comprising a measurement device for measuring the voltage at a point of common coupling, the method comprises a further step of:

communicating a signal from the measurement device to the power plant controller, which can restart the first control loop.

According to one embodiment of the second aspect of the invention, the method comprises a further step of:

feeding an interrupt to the at least one wind turbine generator-from the power plant controller, and the at least one wind turbine generator is acting upon the interrupt According to one embodiment of the second aspect of the invention, the method for controlling a voltage level in a wind power plant comprises a gains and a ratio of gains for the first and/second controller that can be varied based on a short circuit ratio and a X/R ratio of a common connection point of the wind power plant.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

Figure 1:
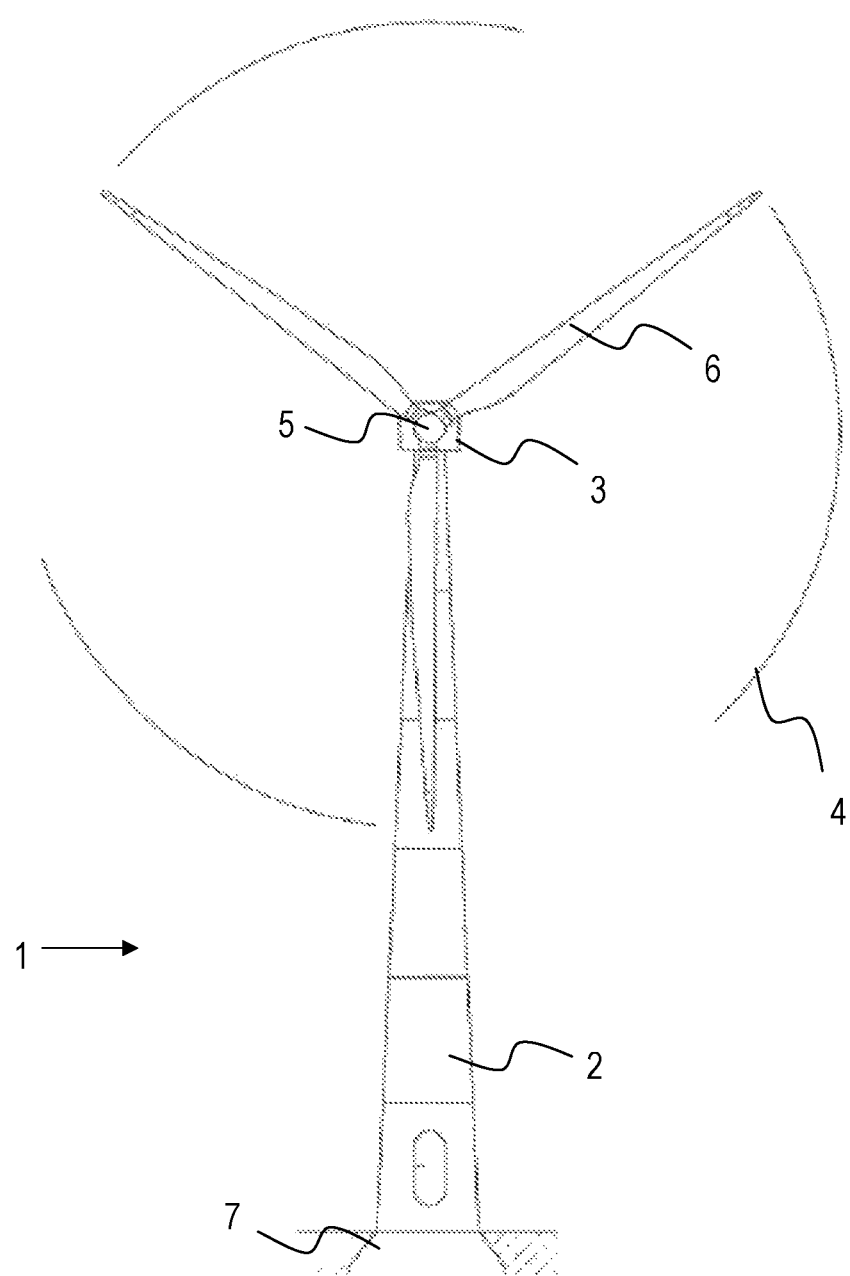
FIG. 1 shows a general structure of a wind turbine.

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Due to the advancements in the grid code requirements and more wind energy entering into the electrical grid, there is an important need for wind turbine generator and especially wind power plant to be able to provide the support required by the grid whenever necessary. Voltage stability is seen to be the major problem in many power systems especially at the location of the wind power plant. Hence, the WTG should be able to provide advanced support which can be comparable to that of the traditional synchronous machine with respect to the voltage support.

The present invention provides a method and a setup with multi bandwidth voltage controllers, a first one with a high bandwidth, implemented in a voltage controller of the wind turbine generator and a second one with a low bandwidth, implemented in a voltage controller of the power plant controller.

The response of a synchronous machine during a voltage drop will be due to its inherent properties be an injection of reactive power because of the immediate demagnetisation of the stator. The high bandwidth or fast controller response of wind turbine voltage controller of the present invention can be seen as a parallel this of the synchronous machine. The slower response of the excitation controller is the parallel to the low bandwidth controller or the slower power plant voltage controller.

The bandwidth of the controller is here to be understood as—at what higher frequency the controller still provides a response, similar to the classical analogue interpretation: The bandwidth frequency is defined as the frequency at which the closed-loop magnitude response is equal to −3 dB. So a controller with a high bandwidth will provide a fast response to changes and a controller with a low bandwidth will provide a slow response. In the digital control the term "bandwidth of a controller" may be understood as a measure of available or consumed data communication resources expressed in bits/second or multiples of it. Thus, "bandwidth of a controller" can be seen as synonymous with "bit rate of a controller", "channel capacity of a controller" or "throughput of a controller". A controller with a high bandwidth will have a high bit rate and thus provide a fast response to changes, whilst a controller with a lower bandwidth will have a lower bit rate and thus provide a slower response. Both interpretations can be used.

Electrical power, known to the person skilled in the art, can be divided into an active power component and a reactive power component. For voltage control it is often a change in the reactive power which provides the largest change in the voltage, whereas changes in the frequency often is linked to the active power changes.

FIG. 1 shows a general setup of a wind turbine generator 1. The wind turbine generator 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid. The wind turbine generator may also form part of a wind farm or a wind power plant comprising a plurality of wind turbines. All the electrical power generated by the individual wind turbines generators in the wind farm are consolidated and supplied to the power grid via a Point of Common Coupling PCC (not shown in FIG. 1).

Although the wind turbine 1 shown in FIG. 1 has three blades 6, it should be noted that a wind turbine may have different number of blades. It is common to find wind turbines having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

The idea of the present invention is to operate the WPP under the voltage control mode which has at least two bandwidths. The voltage controller present inside the wind turbine generator will act as a higher bandwidth (fast acting) controller and will be responding on its own as soon as voltage disturbance is seen, one of the targets for the voltage controller of the present invention is to achieve the pre-fault voltage at the WTG terminals. This action will be carried on by all the wind turbine generators available in the wind power plant and can be considered to be at the turbine level.

However, as soon as the Power plant controller identifies the disturbance a new set of control signals will be generated. The new set of control signals can be based on various other parameters such as availability of WTGs, available slack on the STATCOM 230 (see FIG. 4) or MSC (not shown), requirement from the grid code and system condition (Short Circuit Ratio & X/R ratio) at that instant.

The new set of control signals or reference signals will be passed to the WTG with a communication delay between the PPC and WTG and there will also be a delay between the WTG main controller and a converter controller within the power electronic converter of the wind turbine generator if any such is present. Apart from these, there could also be an intentional loop time delay for the power plant controller except in case of the interrupt-based communication. This can be considered to be operating at a lower bandwidth and will be overwriting the command being followed by the WTG based on the high bandwidth logics.

It is important not to have the same bandwidth of both voltage controllers, as two controllers at the same bandwidth can leads to oscillation in the voltage and to make sure that the inner loop follows the outer loop.

The WTG controller tries to control the voltage level at the wind turbine generator connection if no command is given from PPC. If a command is given from PPC and if WTGs follows the command, the WTG will be controlling the voltage at the PCC, but being supervised by PPC.

The PPC controls the voltage at the PCC point. Also, the PPC often has other control modes like reactive power control or a Power Factor (PF) control mode, where the target is reactive power (Q) or PF and no longer the voltage.

In one embodiment of the present invention there are more than two levels of bandwidth of the control loops, namely when there are additional voltage controlling equipment installed within the WPP, As an example—a wind power plant may have a plurality of wind turbine generators 201, and a STATCOM (see FIG. 4) for providing fast reactive power compensation, and some mechanically switched capacitors (MSC) or reactors (MSR) for providing slower reactive power compensation and a power plant controller (PPC) 210 operating at different bandwidths An advantage of the present invention of a multi bandwidth controller is an enhancement of the stability of the grid as well as the possibility to make the best utilization of available reactive power capability and system level control available at the power plant controller.

The control strategy during the recovery of the voltage after an event in the grid is also important to avoid any unforeseen problems in the grid. This can be handled by the interrupt-based communication from the power plant controller to the at least one wind turbine which responds to the interrupt. This may restart the fast voltage control loop.

In a preferred embodiment $Q_{ref}$ is used as the parameter to dispatch instead of the actual voltage reference signal, as the use of $Q_{ref}$ is believed to be faster in response time.

In an embodiment the dispatched $Q_{ref}$ may be different from turbine to turbine. The $Q_{ref}$ for each turbine may be calculated based on measured impedances for each turbine, or based on feedback, or alternatively based on a learning algorithm when the Power plant controller learns impedance level of each turbine based on a small signal response or data capturing during normal operation.

In an embodiment the dispatched $V_{ref}$ may different from turbine to turbine. The $V_{ref}$ for each turbine may be calculated based on measured impedances for each turbine, or based on feedback, or alternatively based on a learning algorithm when the Power plant controller learns impedance level of each turbine based on a small signal response or data capturing during normal operation. Different $V_{ref}$ to each wind turbine generator should take into consideration the fact that the voltage level along a power line/cable drops due to the impedance of the line/cable.

In an embodiment, the ratio of bandwidths can vary between 5 and 10.

In an embodiment, the ratio of bandwidths can vary between 10 and 20.

In another embodiment the ratio of bandwidth can vary between 5 and 20

In another embodiment, the ratio of bandwidths can vary depending on the connection point of the WPP to the grid. The bandwidths of the turbine and the PPC under normal or fault conditions can also be adjusted based on the SCR and X/R ratio of the grid.

In another embodiment of the invention, the gains and the ratio of the gains for both the WTG and the PPC controllers can be changed based on the SCR and X/R ratio of the grid (partially taken from Vestas patent WO2009083448, ratio is not considered in WO2009083448 patent).

Figure 2:
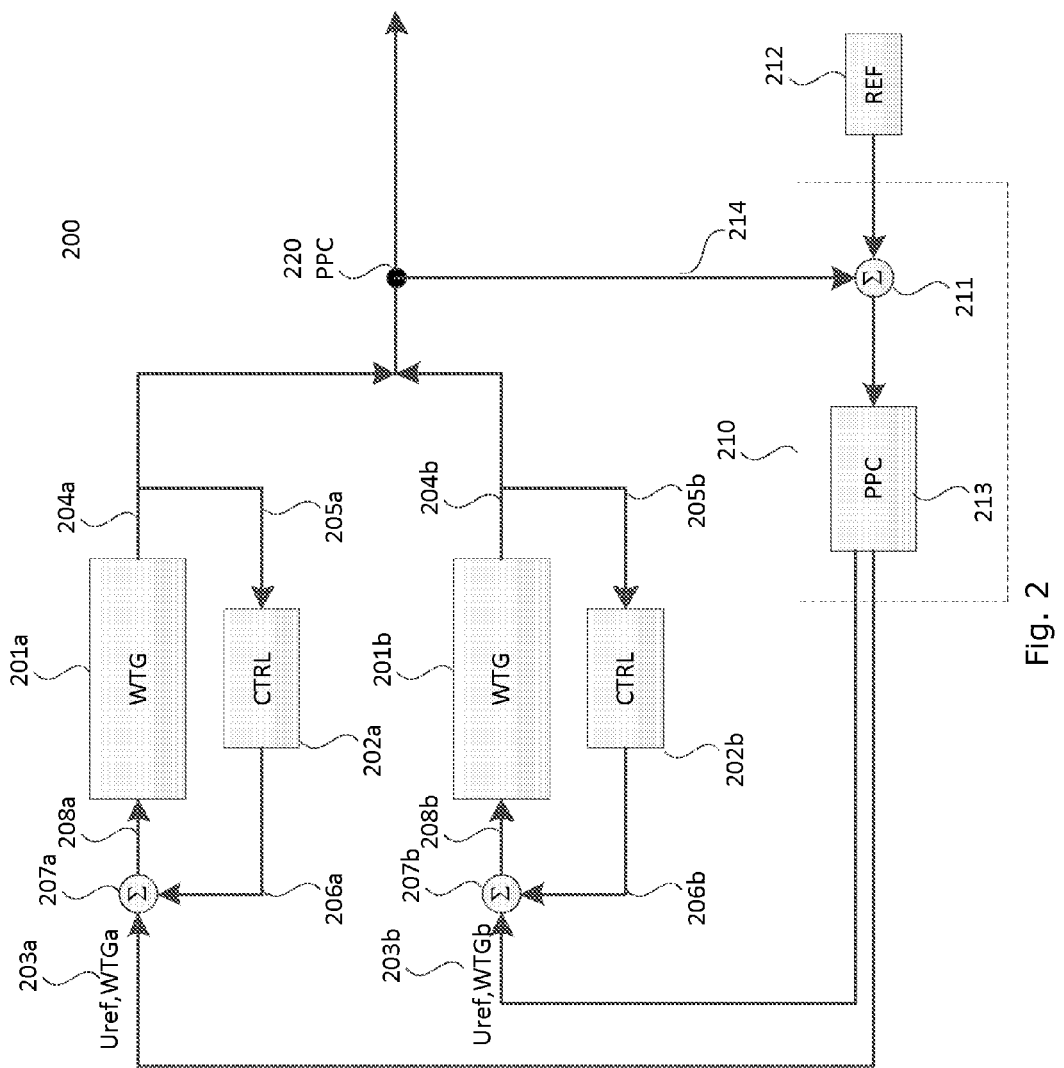
FIG. 2 shows a wind power plant according to the present invention.

FIG. 2 shows a wind power plant 200, with two wind turbine generators 201a, 201b, the number two is just for simplicity, it could be any number higher than two. The wind turbine generator 201a has an output signal 204a, in this example it is the voltage; this signal is measured 205a by voltage sensor (not shown) and fed into a voltage controller 202a of the wind turbine generator. The controller 202a generates a voltage set point 206a, which is compared with a voltage reference $U_{ref}$ 203a in a summation block 207a. The controller error 208a is used as controller parameter in the wind turbine generators 201a. The power plant controller 210 gets measurements 214 of the voltage at the point of common coupling (PCC) 220, obtained by a another voltage sensor (not shown). The measurement 214 is compared to a voltage reference 212 in summation block 211, this reference 212 may have been generated within the power plant controller (PPC) 210 or it may have been supplied externally. The output of the summation block 211 is feed into a PPC voltage controller 213, which dispatches individual voltage references 203 to the individual wind turbine generators 201.

Although FIG. 2 shows that the wind turbine generator receives a $U_{ref}$ 203, some embodiments may not have the $U_{ref}$ 203 signal, i.e. if there no signal from the PPC 210 to the turbine controller 202, 207, the voltage controller at the turbine level 202 controls the voltage level at its own electrical terminals 204.

Figure 3:
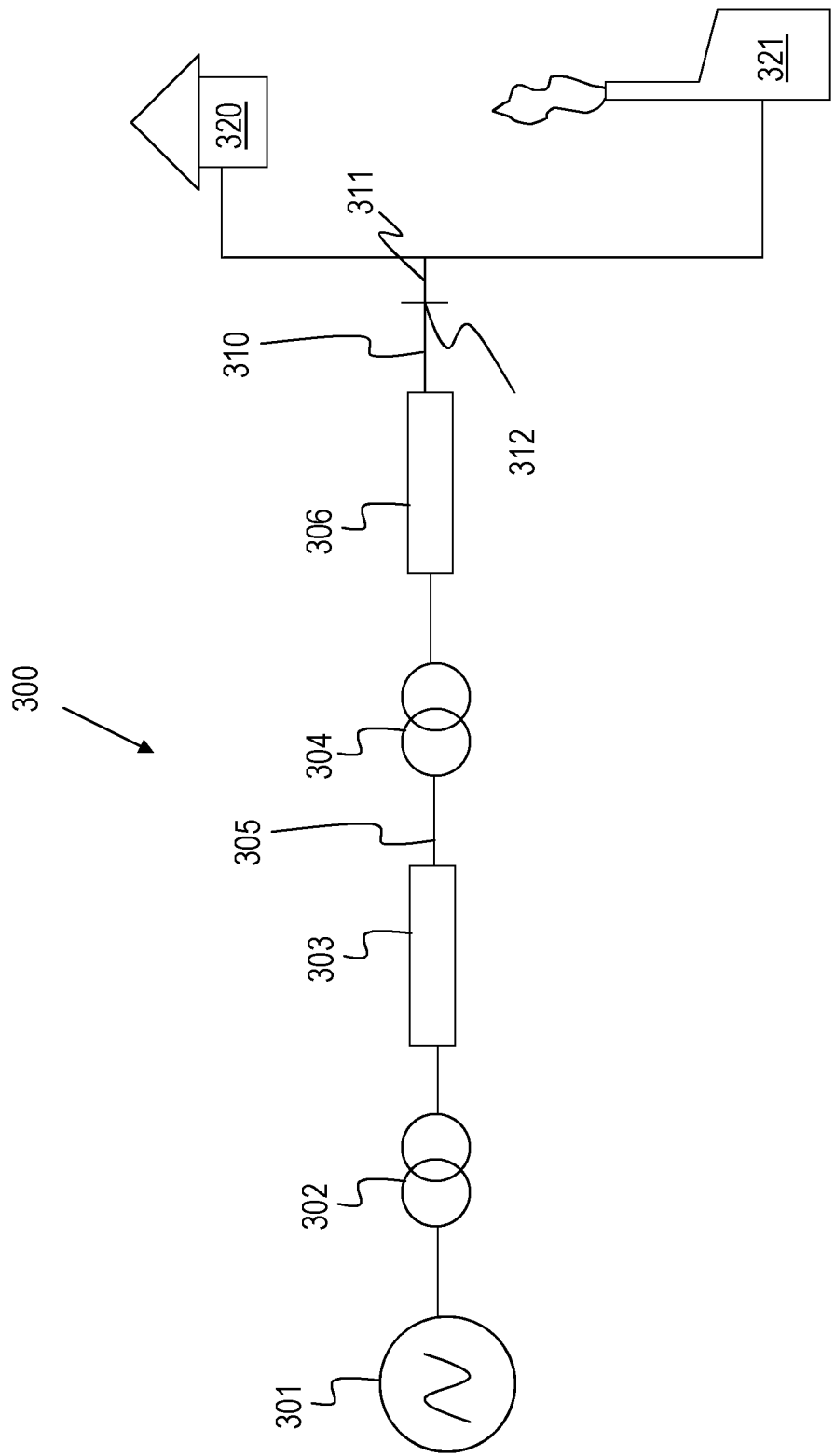
FIG. 3 shows the impedance sources of a wind power plant.

As mentioned, the voltage reference 203 may instead be a reactive power reference, which is not shown in any figure. Even if the reference signal is a reactive power reference, the output signal to be measured may be a voltage signal, in other embodiments it may be a reactive power signal FIG. 3 shows a schematic layout of the wind power plant 300 according to an embodiment. The schematic layout of FIG. 3 illustrates the impedances that are introduced into the wind power plant 300. For the sake of clarity, only one wind turbine generator 301 is illustrated in FIG. 3. It should be noted that the wind power plant 300 may include more than one wind turbines generator 301. Is it also assumed that both the reactive and active current is generated by the wind turbine generator 301. The wind turbine generator 301 is connected to a wind turbine transformer 302. The wind turbine transformer 302 is in turn connected to the wind power plant transformer 304 via power cables 305. The impedance of the power cables 305 is represented by the cable impedance 303. The wind power plant 300 is connected to a utility system or grid 311 using overhead lines (OVL) 310. The impedance of the OVL 310 is represented by the OVL impedance 306. The wind power plant 300 interfaces with the grid 311 through the PCC 312. The grid 311 supplies power to a load, for example a household unit 320. Additional power plants, for example a conventional coal power plant 321, may also supply power to the grid 311. According to an embodiment, the cable impedance 303 and the OVL impedance 306 are taken into account when determining the active and reactive currents to be generated, so as to provide the optimal reactive current at the PCC 312. The WPP can also comprise of other such as transformer, high voltage cable, overhead line or the HVDC connection before connecting to the point of common coupling.

Wind power plants often have reactive power compensation equipment such as STATCOMs 230, Mechanical switched Capacitors, SVC's etc. The STATCOM 230 would also have a voltage controller; the bandwidth of that voltage controller can be higher than both the wind turbine generator voltage controller and the PPC voltage controller bandwidth.

Figure 4:
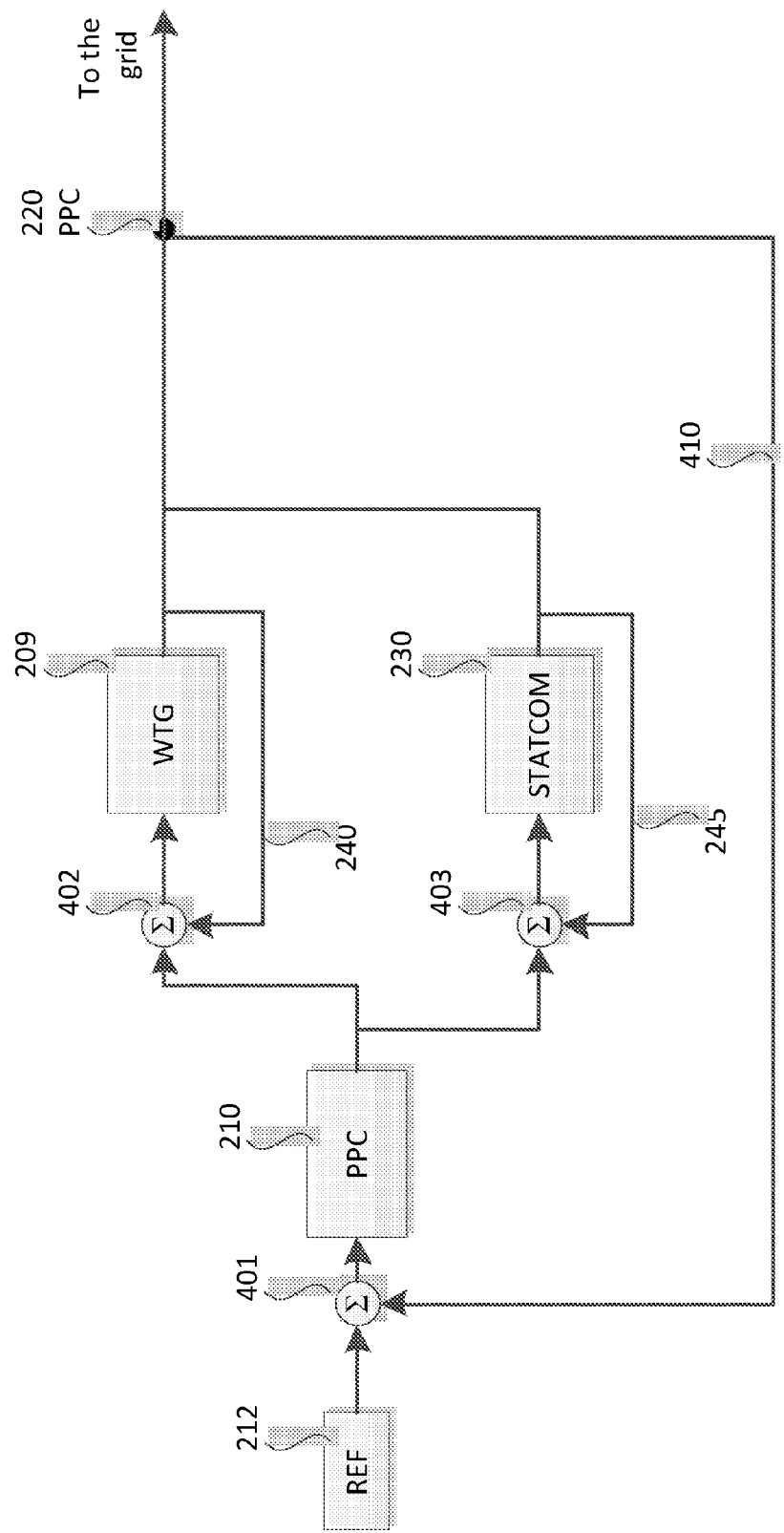
FIG. 4 shows the voltage controllers in a wind power plant with a STATCOM.

FIG. 4 shows a wind power plant with a STATCOM 230 to provide additional reactive power support. The WTG 209 has a feedback control loop 240 as described under FIG. 2. The STATCOM 230 also has a feedback loop 245. The feedback loops 240 and 245 are with high bandwidths, where the bandwidth 245 is higher than the bandwidth 240. The power plant controller 210 provides the outer feedback loop 250, with the lower bandwidth.

In an embodiment the STATCOM 230 responds on its own and the PPC 210, even at a lower bandwidth, just allows the STATCOM 230 to do the control based on the STATCOMs capability instead of the PPC 210 controlling the STATCOM voltage level. The PPC 210 still controls turbines for a target of reactive power $Q_{turbine} = (Q_{total\ required} - Q_{delivered\ by\ STATCOM})$.

In an embodiment of the invention (see FIG. 5) there is a measurement device 511 to measure the voltage at the PCC point that can actuate a flag, send to the PPC which can restart the higher bandwidth control loop immediately.

In an embodiment of the present invention the above mentioned flag and the event triggered in the PPC can be fed to the WTGs as an interrupt signal 520 which can force the WTG to act upon the interrupt commands instead of waiting for the next sample from the PPC.

Figure 5:
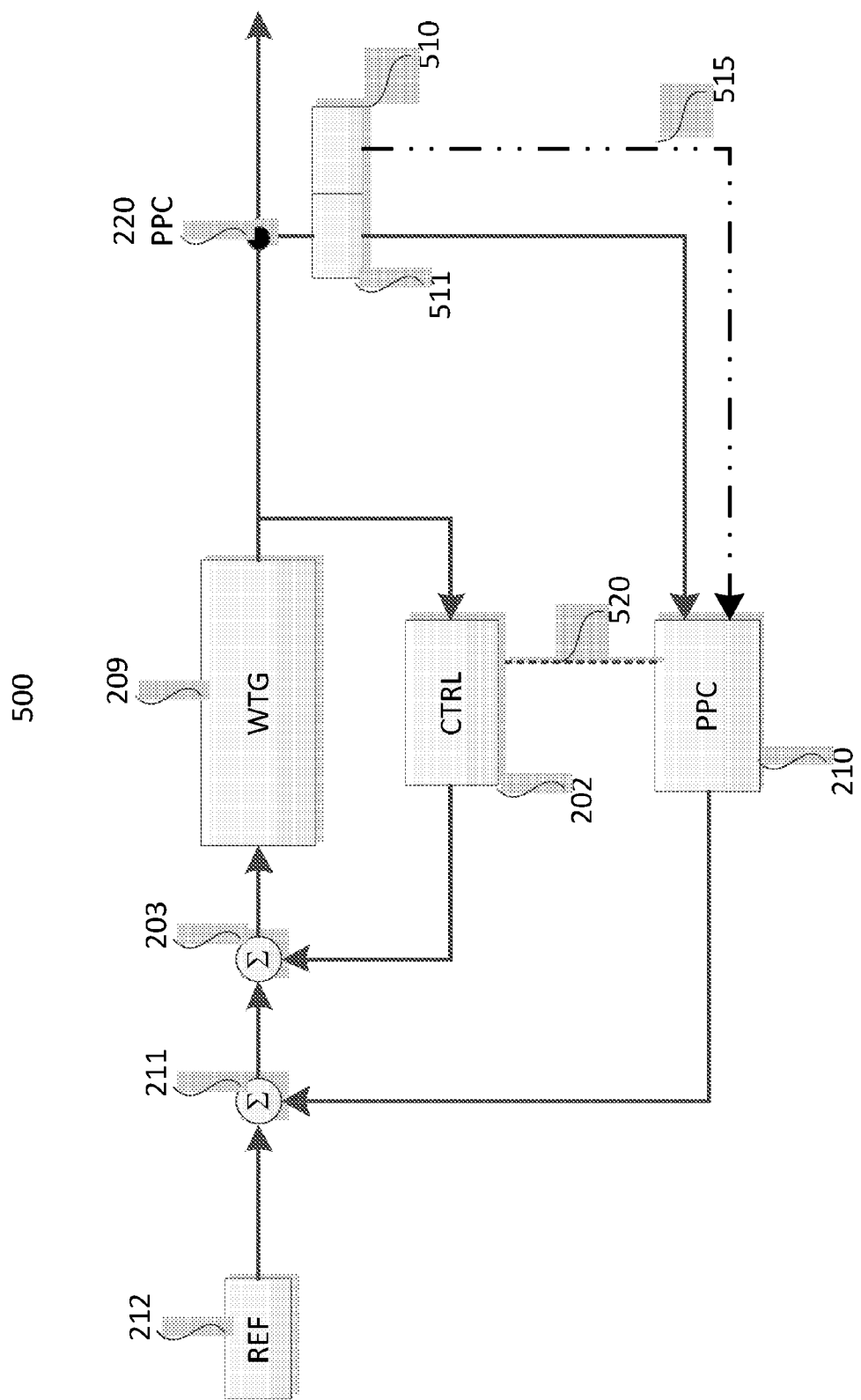
FIG. 5 shows a wind power plant with a measuring device at the point of common coupling that actuate a flag.

FIG. 5 shows a wind power plant 500, similar to the one in FIG. 2, however only showing one wind turbine generator 209. At the point of common coupling the voltage measuring device 500 has a system 510 to actuate a flag, which may be fed 515 to the PPC 210. The PPC may send an interrupt signal 520 to the wind turbine controller 202, which restarts the control loop immediately.

Figure 6:
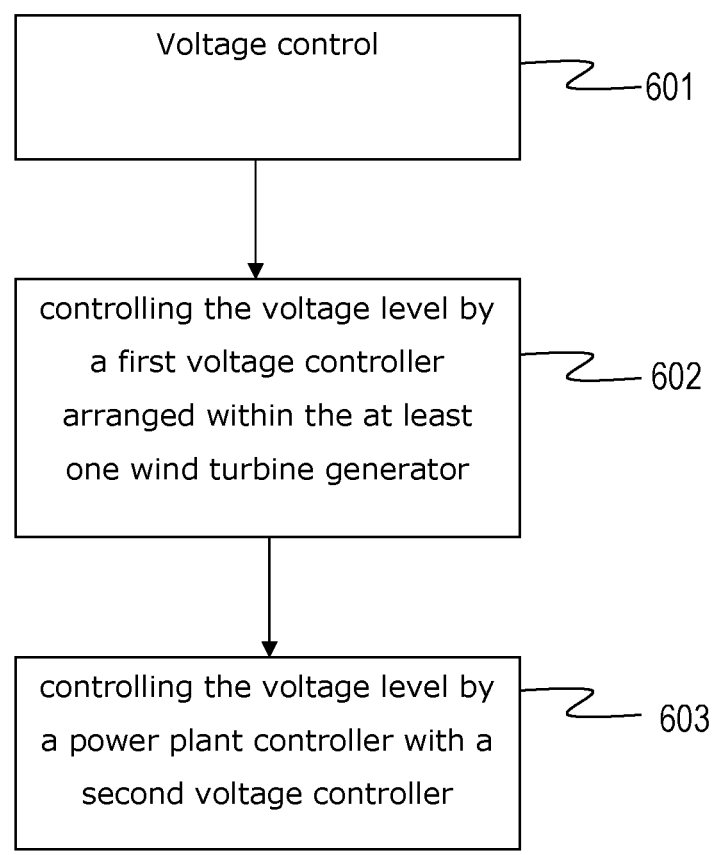
FIG. 6 shows a flow chart of the method of the present invention.

FIG. 6 shows a flow-chart of a method for Method for controlling a voltage level in a wind power plant, with at least one wind turbine generator, and a power plant controller, to an embodiment. Step 601 includes normal operation where no change is required.

Step 602 includes the first control loop with the high bandwidth voltage controller; this control loop is at the wind turbine generator level. Step 603 includes the control loop of power plant controller, with the low bandwidth voltage controller.

The present inventions handles and combines two related control loops in an optimal way and make best use of the available Q capability of WTGs as well as any other Reactive Power Compensation devices available in the WPP. This takes the WTG and PPC to a next level of coordinated control.

The present invention helps wind power plants meeting the grid code requirements which are stringent with respect to the voltage and reactive power/current control. It also enables connection of turbines to weak grids without causing much problems of voltage instability.

In summary the invention relates to, a wind power plant, with at least one wind turbine generator, where each of the at least one wind turbine generator has a first voltage controller with a first bandwidth, arranged for controlling a voltage level, and where the wind power plant has a power plant controller with a second voltage controller with a second bandwidth also arranged for controlling the voltage level, the first bandwidth is larger than the second bandwidth. The invention also relates to a method for controlling the voltage level of a wind power plant, by using multi bandwidth voltage controllers.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A wind power plant, comprising:
   at least one wind turbine generator including an inner control loop, wherein the inner control loop comprises a first voltage controller with a first bandwidth, the first voltage controller arranged for controlling a voltage level of the wind power plant;
   an outer control loop comprising a power plant controller, the power plant controller comprising a second voltage controller with a second bandwidth, the second voltage controller also arranged for controlling the voltage level, wherein the first bandwidth is larger than the second bandwidth; and
   a measurement device configured to:
      measure a voltage at a point of common coupling of the wind power plant, and
      communicate, using the measured voltage, a signal to the power plant controller to control application of voltage control by the inner control loop,
   wherein the power plant controller is configured to:
      transmit, responsive to the communicated signal from the measurement device, an interrupt signal to the at least one wind turbine generator,
      wherein the interrupt signal configures the at least one wind turbine generator to interrupt application of voltage control by the inner control loop.

2. The wind power plant according to claim 1, wherein the voltage level is controlled at the point of common coupling.

3. The wind power plant according to claim 1, wherein a ratio between the first bandwidth and the second bandwidth is between 5 and 10.

4. The wind power plant according to claim 1, wherein a ratio between the first bandwidth and the second bandwidth is between 10 and 20.

5. The wind power plant according to claim 1, wherein a ratio between the first bandwidth and the second bandwidth is selected based on a short circuit ratio determined at a common connection point of the wind power plant.

6. The wind power plant according to claim 1, wherein at least one of the first bandwidth and the second bandwidth is selected based on an impedance of a grid connecting point of the wind power plant.

7. A wind power plant, comprising:
   at least one wind turbine generator including an inner control loop, wherein the inner control loop comprises a first voltage controller with a first bandwidth, the first voltage controller arranged for controlling a voltage level of the wind power plant;
   an outer control loop comprising a power plant controller, the power plant controller comprising a second voltage controller with a second bandwidth, the second voltage controller also arranged for controlling the voltage level, wherein the first bandwidth is larger than the second bandwidth; and
   a measurement device configured to:
      measure a voltage at a point of common coupling of the wind power plant, and
      communicate, using the measured voltage, a signal to the power plant controller to control application of voltage control by the inner control loop,
   wherein a gain ratio of a first gain of the first voltage controller and a second gain of the second voltage controller is selected based on a short circuit ratio and a X/R ratio determined at the point of common coupling.

8. The wind power plant according to claim 1, further comprising a reactive power compensation unit comprising a third voltage controller having a third bandwidth, wherein the third bandwidth is different than the first bandwidth and different than the second bandwidth.

9. The wind power plant of claim 7, wherein the voltage level is controlled at the point of common coupling.

10. The wind power plant of claim 7, wherein a ratio between the first bandwidth and the second bandwidth is between 5 and 10.

11. The wind power plant of claim 7, wherein a ratio between the first bandwidth and the second bandwidth is between 10 and 20.

12. A method for controlling a voltage level in a wind power plant comprising at least one wind turbine generator including an inner control loop, the wind power plant further comprising an outer control loop comprising a power plant controller, the method comprising:
   controlling the voltage level with a first voltage controller arranged within the inner control loop, the first voltage controller having a first bandwidth;
   controlling the voltage level using a second voltage controller of the power plant controller within the outer control loop, the second voltage controller having a second bandwidth, wherein the first bandwidth is larger than the second bandwidth;
   communicating, from a measurement device configured to measure a voltage at a point of common coupling, a signal to the power plant controller to control application of voltage control by the inner control loop; and
   transmitting, using the power plant controller responsive to the communicated signal, an interrupt signal to the at least one wind turbine generator,
   wherein the interrupt signal configures the at least one wind turbine generator to interrupt application of voltage control the inner control loop.

13. The method for controlling a voltage level in a wind power plant according to claim 12, wherein a ratio between the first bandwidth and the second bandwidth is between 5 and 20.

14. The method for controlling a voltage level in a wind power plant according to claim 12, wherein a ratio between the first bandwidth and the second bandwidth is selected based on a short circuit ratio determined at a common connection point of the wind power plant.

15. The method for controlling a voltage level in a wind power plant according to claim 12, wherein at least one of the first bandwidth and the second bandwidth is selected based on an impedance of a grid connecting point of the wind power plant.

16. The method for controlling a voltage level in a wind power plant according to claim 12, further comprising:
controlling the voltage level using a third voltage controller in a reactive power compensation unit, wherein the third voltage controller has a third bandwidth greater than the first bandwidth and the second bandwidth.

17. A method for controlling a voltage level in a wind power plant comprising at least one wind turbine generator including an inner control loop, the wind power plant further comprising an outer control loop comprising a power plant controller, the method comprising:
controlling the voltage level with a first voltage controller arranged within the inner control loop, the first voltage controller having a first bandwidth;
controlling the voltage level using a second voltage controller of the power plant controller within the outer control loop, the second voltage controller having a second bandwidth, wherein the first bandwidth is larger than the second bandwidth; and
communicating, from a measurement device configured to measure a voltage at a point of common coupling, a signal to the power plant controller to control application of voltage control by the inner control loop,
wherein a gain ratio of a first gain of the first voltage controller and a second gain of the second voltage controller is selected based on a short circuit ratio and a X/R ratio determined at the point of common coupling.

18. The method of claim 17, wherein a ratio between the first bandwidth and the second bandwidth is between 5 and 10.

19. The method of claim 17, wherein a ratio between the first bandwidth and the second bandwidth is between 10 and 20.

20. The method of claim 17, further comprising:
controlling the voltage level using a third voltage controller in a reactive power compensation unit, wherein the third voltage controller has a third bandwidth greater than the first bandwidth and the second bandwidth.

* * * * *